United States Patent Office 3,488,114
Patented Jan. 6, 1970

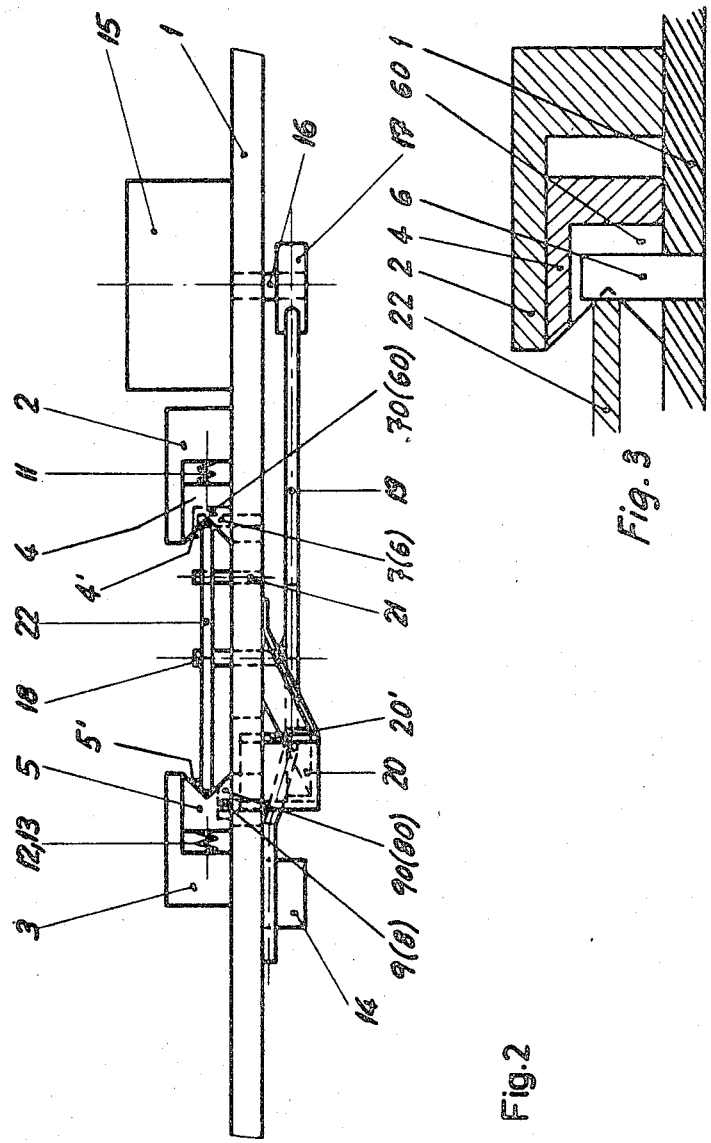

1

3,488,114
HOLDER FOR SLIDES, TRANSPARENCIES AND THE LIKE
Reinhard Zeindler, Zurich, and Peter Steffen, Dietikon, Zurich, Switzerland, assignors to Ciba Limited, Basel, Switzerland, a company of Switzerland
Filed June 23, 1967, Ser. No. 648,258
Claims priority, application Switzerland, June 30, 1966, 9,499/66
Int. Cl. G03b 21/20, 23/00, 23/02
U.S. Cl. 353—85               6 Claims

ABSTRACT OF THE DISCLOSURE

A holder for a flat slide or the like at an aperture in a base plate through which a projection light beam is directed comprises a pair of parallel spaced apart rails having longitudinally extending V-grooves located respectively at opposite sides of the aperture for receiving the slide. The rails are spring-loaded towards each other but in an unequal degree so that the slide is always caused to move in the direction of the less loaded rail, and this latter rails is provided with stationary locating pins which intersect the groove so as to engage and provide a positive stop for the slide in the lateral direction. A rotatable electrically energized magnet operates a lever engageable with one edge of the slide or transparency for ejecting it from the rails, and an interceptor plate is caused to move into the path of an ejected slide so as to deflect it by an amount sufficient to permit another slide to be inserted between the rails.

---

This invention relates to a holder for slides or transparencies.

Previously proposed holders have the defect of not sufficiently precisely locating a slide over a window, particularly when the frames and mounts differ in thickness (cardboard mounts, plastic frames etc.).

According to the present invention there is provided a holder for slides, transparencies and the like, comprising a base plate, having an upper surfaces and a lower surface, means defining an aperture in said base plate for the passage therethrough of illuminating light, two mounting rails, each rail being provided with a V-shaped groove and being positioned above the upper surface of the base plate, one on either side of said aperture, in spaced parallel relationship with the open end of the grooves directed towards each other, and one of the rails being provided with means defining a plurality of recesses extending from the surface of the rail adjacent the base plate to the groove, a corresponding plurality of pins fixed to the upper surface of the base plate and adapted to be received by said plurality of recesses so that said one rail is transversely slidable on the pins and such that the ends of the pins remote from the base plate extend into the groove, spring means for urging said rails towards one another, said spring means being constructed so that on insertion of a slide or transparency between the rails, said one rail will contact the pins. In a preferred embodiment of the invention the holder also comprises a rotatable magnet mounted on said base plate; means for energizing said magnet to cause rotation thereof in one direction and means for restoring said magnet to its normal position when said magnet is not energized, an ejector lever having one end fixed to said rotatable magnet for rotation therewith, said ejector lever being positioned below the base plate and having its other end projecting upwards into said aperture, the length of said lever and the rotation of said magnet upon energization thereof being selected such that the chord

2 of the arc traversed by said other end of the lever lies substantially in the center plane between said two rails. This facilitates the insertion of the slides because the ejector need not be pushed back into its inoperative position by the action of inserting the slide, as was hitherto necessary in conventional arrangements.

According to another feature of the invention an interceptor plate may be slidably or swingably interposed straight or obliquely in the path of ejection and the ejecting force of said rotatable magnet may be so chosen or adjusted that an ejected slide will be laterally deflected by said interceptor plate at least far enough to remove said slide out of alignment with the opening formed by said aperture between said mounting rails. This feature likewise facilitates the insertion of another slide because the previous slide has been removed and therefore cannot form an inconvenient obstruction. A satisfactory removal of the ejected slide can always be ensured by suitably adjusting the power i.e., the excitation, of said rotatable magnet, even if the nature and thickness of the mounts or frames of the slides should differ considerably (plastics or metal frames, or cardboard mounts). Moreover, the presence of the interceptor plate prevents the ejected slides from being accidentally propelled over the front edge of the baseplate or printing table onto the floor.

A specific embodiment of the invention will now be described by way of example with reference to the accompanying drawings in which:

FIGURE 2 is a side view in the direction of slide insertion and,

FIGURE 3 is a section taken on the line III—III in FIGURE 1.

Figure 1:
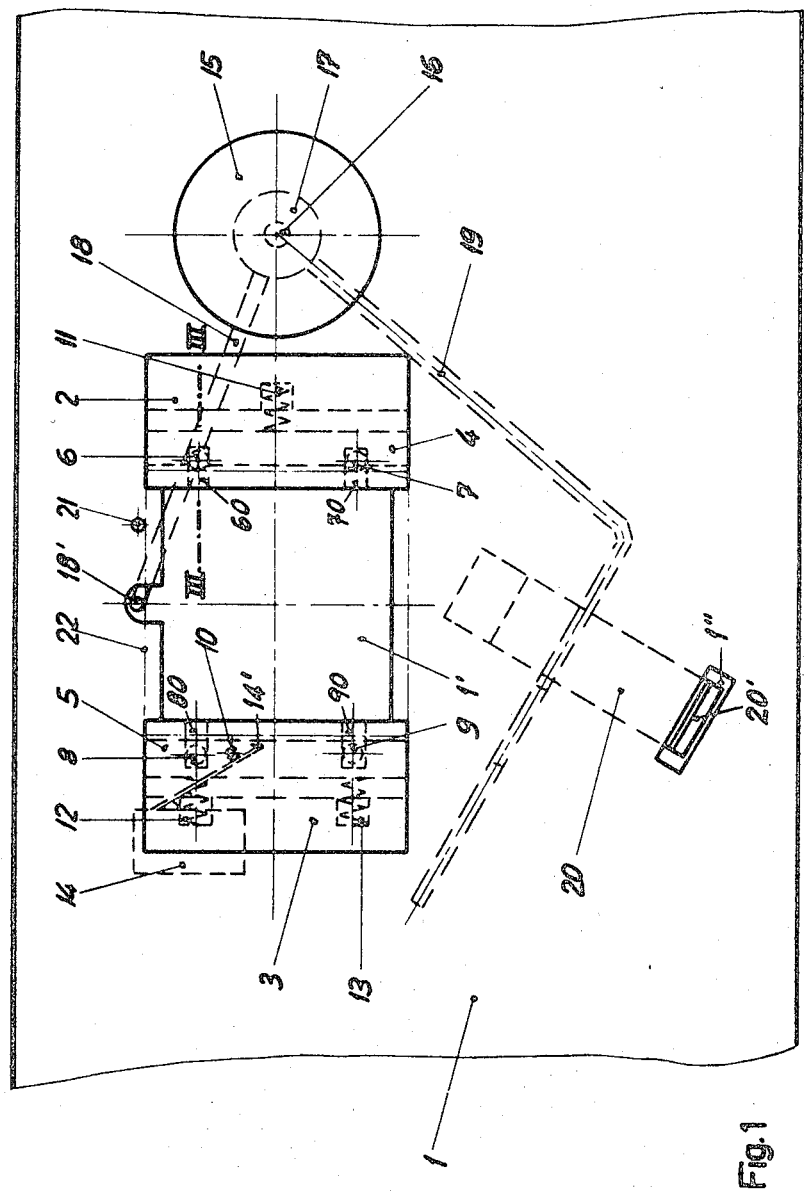
FIGURE 1 is a plan view of the slide holder.

With reference to FIGURES 1 and 2, two mounting rails 4 and 5 on each side of a window 1' are each provided on their sides which face each other across the window with a V-section groove. The mounting rails are held against a baseplate 1 by L-section retainers 2 and 3 and positioned by pins 6, 7 and 8, 9 fitted to the baseplate 1 and engaging recesses 60, 70 and 80, 90 cut into the edges of the mounting rails 4 and 5. The two mounting rails are urged towards one another by compression springs 11 and 12, 13 respectively which are interposed between the mounting rails and their associated retainers. In the illustrated embodiment the left hand mounting rail 5 is associated with two springs 12 and 13, whereas the mounting rail 4 on the right is loaded by a single spring 11. Assuming that all three springs (11, 12 13) having the same spring force characteristic, the result of this arrangement is to make the mounting rail 4 on the right more easily yielding.

In accordance with the invention and as illustrated in detail in FIGURE 3, the locating pins and recesses 6, 7, 60, 70 for the right hand more easily yielding mounting rail 4 are so contrived that the recesses 60 and 70 extend into the V-section groove 4' and the pins 6 and 7 likewise extend into the groove. The ends of the locating pins must project at least slightly beyond the bottom edge of an inserted slide in such manner that when the two mounting rails are pushed outwards by the insertion of the slide the more easily yielding mounting rail 4 will always be sufficiently displaced for the edge of the slide to bear against the two locating pins and thereby to ensure that lateral location of each slide is always exactly the same. Elevation location is prescribed by the two V-grooves 4' and 5'. Location in the direction of slide insertion is provided by a pin 21 which is likewise affixed to the baseplate. The slide is thus always positively centered with respect to the optical axis when two relatively perpendicular edges of the slide are in contact with the three pins that are affixed to the baseplate 1. Contact with the lateral locating pins 6 and 7 in the mounting rail 4 is automatically established when the slide is inserted. The operator need merely make sure that the silde is pushed home until its leading edge strikes the front end pin. This does not require special skill or attention.

It will also be understood from FIGURES 1 and 2 that a switch lever 14' projects into the slideway formed by the V-section groove in the left hand mounting rail 5, the release being provided on a pin 10 adapted to close switch 14 when the mounting rail 5 is forced outwards by the insertion of a slide. This switch may be used for switching the projector lamp on and off, thereby to prolong the life of the lamp and to reduce the time of exposure of the slides to the heat of the lamp, besides preventing or reducing the inconvenience of glare.

The illustrated holder is equipped with special ejecting and deflecting means for removing the slides from the holder after they have been projected.

As shown in FIGURES 1 and 2, the ejecting mechanism comprises an ejector lever 18 affixed to the shaft 16 of a rotatable magnet 15 which automatically returns to normal position (when not excited). In the illustrated embodiment the rotatable magnet is mounted on the baseplate, the shaft passing downwards through a hole in the baseplate and carrying the ejector lever. The ejector lever extends substantially parallel to the baseplate and its deflectable end 18' is bent upwards to pass through the window 1'. The shaft is offset to one side of the mounting rails and located roughly in the transverse plane of symmetry, the length of the lever being such that the chord of the arc traversed by the end 18' of the lever inside the window 1' is substantially contained in the longitudinal plane of symmetry between the two mounting rails 4 and 5.

Moreover, FIGURES 1 and 2 also show that an interceptor plate 20' is deflectable into the path of ejection in front of the mounting rails 4 and 5. In the illustrated embodiment the interceptor plate 20' is mounted substantially at right angles on the free end of a sprung lever 20 of which the other end is affixed to the underside of the baseplate 1. The latter is provided with a slit 1" through which the interceptor plate can pass and the lever 20 is upwardly deflectable against the underside of the baseplate against the resistance of its spring by an actuating lever 19 attached to the rotatable magnet 15. The lever 20 and the interceptor plate 20' are constituted by a leaf spring with an up-angled end. The actuating lever 19 slides across the interceptor plate 20' and thereby pushes the lever upwards and the interceptor plate 20' through the slit 1" into the path of slide ejection when the actuating lever swings counterclockwise from the illustrated position in FIGURE 1. Since the ejector lever 18 and the actuating lever 19 are both affixed to the shaft 16 the interceptor plate will be lifted into the path of the ejected slide when the ejector lever is operated.

The interceptor plate may be yieldingly mounted and it may consist of a flexible material and/or at least it may have an elastic facing.

The ejecting force of the ejector lever 18, that is to say the energization of the rotatable magnet 25 is so adjusted (i.e., preset with facilities for subsequent adjustment) that irrespective of the nature of the slides the ejecting thrust is always sufficient for the interceptor plate to deflect the slides far enough to prevent them from obstructing the insertion of the next slide.

The above described embodiment is operated as follows:

The slide 22 is inserted from the front end between the mounting rails 4 and 5, i.e., into the V-section grooves 4' and 5', until it strikes the locating pin 21. The springs 12 and 13 loading the mounting rail 5 urge the frame of the transparency side ways (to the right) sufficiently to ensure that the right hand edge of the slide makes contact with the locating pins 6 and 7. These pins in co-operation with the centralizing action of the V-section grooves ensure that the slides will be exactly positioned, irrespective of the thickness of their mounts or frames. During the insertion of the slide 22, the pin 10 operates the switch 14. This causes the projector lamp to be switched on. After exposure the rotatable magnet 15 is briefly energized. The magnet rotates shaft 16 through an angle of 90° (in FIGURE 1 counterclockwise) and is returned into normal position by a built-in spring (not shown).

The ejector lever 18 ejects the slide 22 forwards out of the V-section mounting rails. At the same time the interceptor plate 20' is lifted by the actuating lever 19. The interceptor plate deflects the slide which comes to rest in a convenient position (on the right as viewed in FIGURE 1). The interceptor plate 20' is then retracted when the ejecting action is completed and is not therefore in the way when another slide is inserted into the holder.

We claim:
1. A holder for slides, transparencies and the like comprising:
 (a) a base plate, having an upper surface and a lower surface,
 (b) means defining an aperture in said base plate for the passage therethrough of illuminating light,
 (c) a first and a second transversely slidable mounting rail, each rail being provided with a V-shaped groove and being positioned above the upper surface of the base plate, one on either side of said aperture, in spaced parallel relationship with the open end of the grooves directed towards each other, and the first rail being provided with means defining a plurality of recesses extending from the surface of the rail adjacent the base plate to the groove,
 (d) a corresponding plurality of stationary locating pins fixed to the upper surface of the base plate and received within said plurality of recesses, the ends of said pins remote from the base plate extending into the groove, and said first rail being transversely slidable on said pins, and
 (e) spring means respectively engaged with and urging said rails towards one another, said spring means being adjusted relatively to each other such that said first rail is more yieldably sprung than said second rail whereby upon insertion of a slide between the rails, said first rail will be sufficiently transversely displaced for the edge of the slide or transparency to bear against and be stopped by said locating pins.

2. A holder for slides, transparencies and the like comprising:
 (a) a base plate, having an upper surface and a lower surface,
 (b) means defining an aperture in said base plate for the passage therethrough of illuminating light,
 (c) a first and a second mounting rail, each rail being provided with a V-shaped groove and being positioned transversely slidable above the upper surface of the base plate, one on either side of said aperture, in spaced parallel relationship with the open end of the grooves directed towards each other, and the first rail being provided with means defining a plurality of recesses extending from the surface of the rail adjacent the base plate to the groove,
 (d) a corresponding plurality of locating pins fixed to the upper surface of the base plate and received within said plurality of recesses so that said first rail is transversely slidable on the pins and such that the ends of the pins remote from the base plate extend into the groove,
 (e) spring means respectively engaged with and urging said rails toward one another, said spring means being adjusted relatively to each other such that said first rail is more yieldably sprung than said second rail whereby upon insertion of a slide or transparency between the rails, said first rail will be sufficiently transversely displaced for the edge of the slide or transparency to bear against and be stopped by said locating pins,
(f) a rotatable magnet mounted on said base plate,
(g) means for energizing said magnet to cause rotation thereof in one direction,
(h) means for restoring said magnet to its normal position when said magnet is not energized, and
(i) an ejector lever having one end fixed to said rotatable magnet for rotation therewith, said ejector lever being positioned below the base plate and having its other end projecting upwards into said aperture, the length of said lever and the rotation of said magnet upon energization thereof being selected such that the chord of the arc traversed by said other end of the lever lies substantially in the center plane between said two rails.

3. The holder of claim 2, and further comprising an interceptor plate, means for moving said interceptor plate into the path of a slide or transparency ejected from between said rails such that said ejected slide or transparency is laterally deflected sufficiently to allow a further slide or transparency to be inserted between said rails.

4. The holder of claim 3, wherein the means for moving said interceptor plate include means for withdrawing said interceptor plate below the upper surface of said base plate.

5. The holder of claim 4, wherein the interceptor plate is yieldable.

6. The holder of claim 5, and comprising a sprung lever having one end fixed to the lower surface of the base plate therewith and having the other end fixed to the interceptor plate, means defining a slit in said base plate for the passage therethrough of said interceptor plate, an actuating lever having one end fixed to the magnet for rotation therewith and the other end engageable with said sprung lever such that energization of the magnet causes the actuating lever to deflect the sprung lever and hence move the interceptor plate through the slit.

References Cited

UNITED STATES PATENTS

| | | | |
|---|---|---|---|
| 1,930,421 | 10/1933 | Ehmer | 353—85 |
| 2,153,221 | 4/1939 | Wittel | 353—104 |
| 2,298,369 | 10/1942 | Greaves | 353—104 |
| 3,053,146 | 9/1962 | King | 353—104 |
| 3,110,217 | 11/1963 | Millner et al. | 353—112 |
| 3,114,285 | 12/1963 | Harris | 353—104 |
| 3,138,062 | 6/1964 | Maiershofer | 353—85 |
| 3,143,035 | 8/1964 | Morgan | 353—85 |

FOREIGN PATENTS 236,219  11/1961  Australia.

NORTON ANSHER, Primary Examiner

RICHARD M. SHEER, Assistant Examiner

U.S. Cl. X.R.

353—104, 105